US012687107B2

(12) United States Patent
Panek et al.

(10) Patent No.: US 12,687,107 B2
(45) Date of Patent: Jul. 21, 2026

(54) SENSOR ASSEMBLY FOR PULSER COMMUNICATION AT THE SURFACE

(71) Applicant: Nabors Drilling Technologies USA, Inc., Houston, TX (US)

(72) Inventors: Maciej Panek, West Chester, PA (US); Christopher Conrad, Glen Mills, PA (US); Sergei Knizhnik, Exton, PA (US); Neal Beaulac, Willis, TX (US); Lance Tomlinson, Spring, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 315 days.

(21) Appl. No.: 18/583,406

(22) Filed: Feb. 21, 2024

(65) Prior Publication Data

US 2024/0280015 A1 Aug. 22, 2024

Related U.S. Application Data

(60) Provisional application No. 63/486,315, filed on Feb. 22, 2023.

(51) Int. Cl.
E21B 47/18 (2012.01)
G01V 11/00 (2006.01)

(52) U.S. Cl.
CPC ............ E21B 47/18 (2013.01); G01V 11/002 (2013.01)

(58) Field of Classification Search
CPC .............................. E21B 47/18; G01V 11/002
See application file for complete search history.

(56) References Cited

U.S. PATENT DOCUMENTS

| | | | |
|---|---|---|---|
| 6,956,791 B2 | 10/2005 | Dopf et al. | |
| 9,976,414 B2 | 5/2018 | Switzer et al. | |
| 2004/0074639 A1* | 4/2004 | Runia | E21B 47/01 |
| | | | 166/383 |
| 2004/0145970 A1 | 7/2004 | Dopf et al. | |
| 2010/0212963 A1 | 8/2010 | Gopalan et al. | |
| 2015/0226058 A1 | 8/2015 | Stolpman | |

(Continued)

FOREIGN PATENT DOCUMENTS

| | | | |
|---|---|---|---|
| CN | 216767368 U | * | 6/2022 |
| CN | 217765488 U | * | 11/2022 |
| WO | 2022216924 A1 | | 10/2022 |

OTHER PUBLICATIONS

CN-216767368-U, English Translation (Year: 2022).*

(Continued)

*Primary Examiner* — Ryan D Walsh
(74) *Attorney, Agent, or Firm* — Haynes and Boone, LLP

(57) ABSTRACT

A system including a logging tool that comprises a pulser, and a sensor assembly removably attached the pulser while the logging tool is outside of a wellbore, where the logging tool operates the pulser and causes change of a detectable object in the pulser, wherein the sensor assembly detects change of the detectable object and transmits a signal to a data acquisition computer that is representative of the detected change. A method including operations of removably attaching a sensor assembly to a body of a pulser of a logging tool, detecting operation of the pulser via the sensor assembly, and emulating pressure pulses from the pulser by converting, via the sensor assembly, the detected pulser operation into synthetic pressure pulses.

20 Claims, 11 Drawing Sheets

(56) References Cited

U.S. PATENT DOCUMENTS

| 2016/0010449 A1 | 1/2016 | Liu et al. |
| 2016/0194952 A1 | 7/2016 | Switzer et al. |
| 2018/0128099 A1 | 5/2018 | Barbely |
| 2024/0191620 A1 | 6/2024 | Miller et al. |

OTHER PUBLICATIONS

CN-217765488-U, English Translation (Year: 2022).*
International Search Report and Written Opinion for PCT/US2024/016702, mailed Jun. 19, 2024, 8 pages.

* cited by examiner

CROSS-SECTION LINE 6-6

CROSS-SECTION LINE 8-8

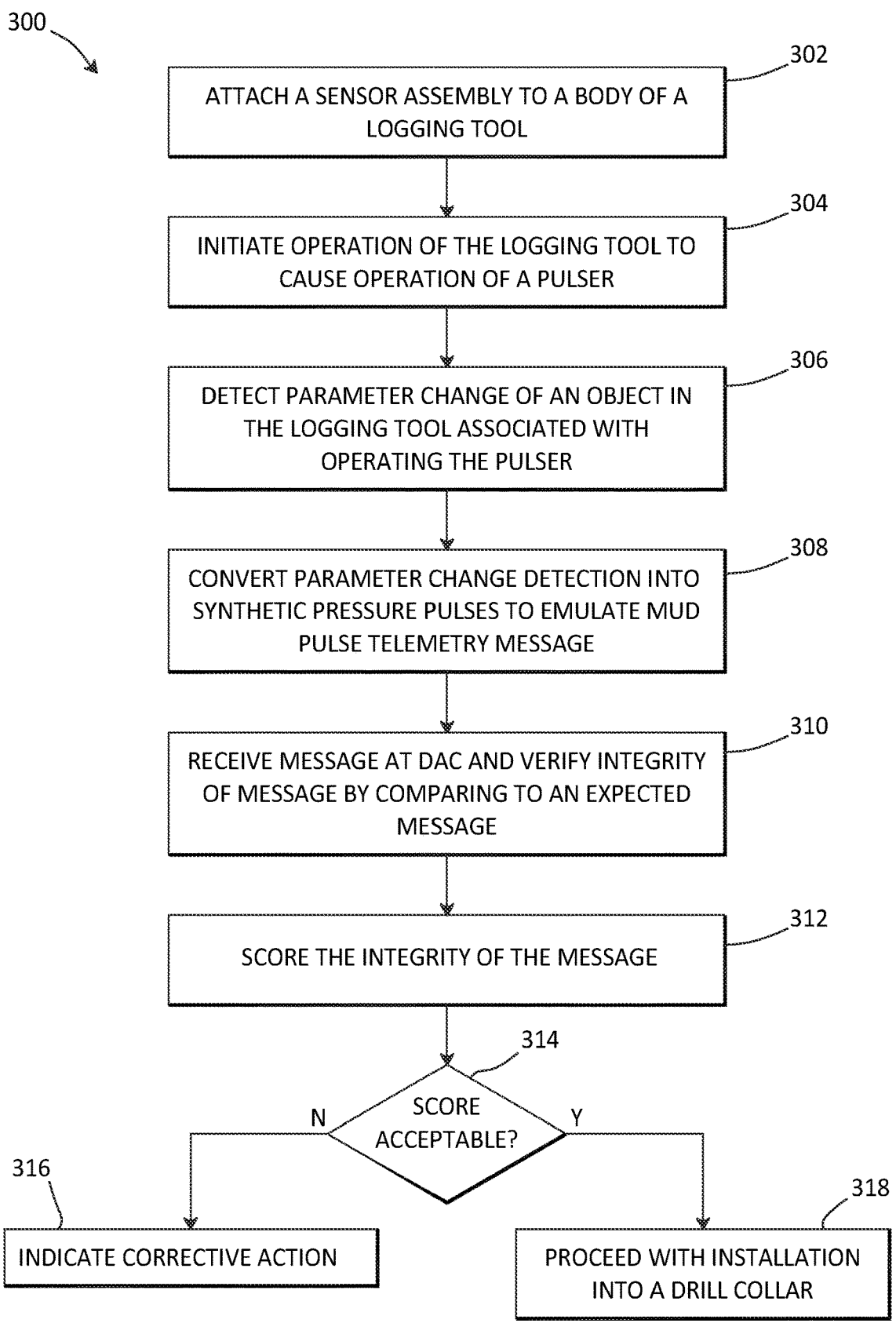

300

302
ATTACH A SENSOR ASSEMBLY TO A BODY OF A
LOGGING TOOL

304
INITIATE OPERATION OF THE LOGGING TOOL TO
CAUSE OPERATION OF A PULSER

306
DETECT PARAMETER CHANGE OF AN OBJECT IN
THE LOGGING TOOL ASSOCIATED WITH
OPERATING THE PULSER

308
CONVERT PARAMETER CHANGE DETECTION INTO
SYNTHETIC PRESSURE PULSES TO EMULATE MUD
PULSE TELEMETRY MESSAGE

310
RECEIVE MESSAGE AT DAC AND VERIFY INTEGRITY
OF MESSAGE BY COMPARING TO AN EXPECTED
MESSAGE

312
SCORE THE INTEGRITY OF THE MESSAGE

314
SCORE
ACCEPTABLE?
N                    Y

316
INDICATE CORRECTIVE ACTION

318
PROCEED WITH INSTALLATION
INTO A DRILL COLLAR

FIG. 10

SENSOR ASSEMBLY FOR PULSER COMMUNICATION AT THE SURFACE

CROSS-REFERENCE TO RELATED APPLICATION(S)

This application claims priority under 35 U.S.C. § 119(e) to U.S. Provisional Application No. 63/486,315, entitled "SENSOR ASSEMBLY FOR PULSER COMMUNICATION AT THE SURFACE," by Maciej PANEK et al., filed Feb. 22, 2023, which is assigned to the current assignee hereof and incorporated herein by reference in its entirety.

FIELD OF THE DISCLOSURE

The present invention relates, in general, to the field of drilling and processing of wells. More particularly, present embodiments relate to a system and method for validating a pulser operation at the surface.

BACKGROUND

During a drilling operation, a bottom hole assembly (BHA) can be connected at an end of a drill string for extending a wellbore further into a subterranean formation. The BHA can include a drill bit at its lower end that can be driven by a mud motor, such as for slide drilling or directional drilling. Above the mud motor, the BHA can include one or more drill collars that can each contain one or more logging tools. The logging tools can be used to detect parameters of the wellbore, the surrounding environment (including the surrounding formation), and the drill string, and then communicate these parameters to the surface for processing. The logging tools can transmit parameter information during drilling operations to support Logging While Drilling (LWD) or Measuring While Drilling (MWD) operations. Some logging tools may use mud pulse telemetry for communicating the parameters to the surface. These logging tools are complex assemblies that can provide vital information about the current drilling operation. Therefore, if these tools fail, they are likely to be tripped out of the wellbore, repaired or replaced, and tripped back into the well. However, it is possible that the newly repaired tool or the replacement tool may incur damage or failure of some component prior to it being installed downhole, which would require another cycle to trip the tool out, repair it, and trip the tool back into the wellbore. Therefore, improvements in Logging While Drilling (LWD) or Measuring While Drilling (MWD) operations are continually needed.

SUMMARY

This summary is provided to introduce a selection of concepts that are further described below in the detailed description. This summary is not intended to identify indispensable features of the claimed subject matter, nor is it intended for use as an aid in limiting the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for testing operation of a tool used for subterranean operations, where the system can also include a logging tool that may include a pulser; and a sensor assembly that is proximate to the pulser while the logging tool is outside of a wellbore, where the logging tool operates the pulser, and where the sensor assembly detects a change in a parameter of a detectable object in the pulser and transmits a signal to a data acquisition computer that is representative of the change in the parameter. Other embodiments of this aspect include corresponding computer systems, apparatus, and computer programs recorded on one or more computer storage devices, each configured to perform the actions of the methods.

One general aspect includes a method for testing operation of a tool used for subterranean operations, where the method can also include positioning a sensor assembly proximate to a body of a pulser of a logging tool; detecting operation of the pulser via the sensor assembly; and emulating pressure pulses from the pulser by converting, via the sensor assembly, the detected pulser operation into synthetic pressure pulses. Other embodiments of this aspect include corresponding computer systems, apparatus, and computer programs recorded on one or more computer storage devices, each configured to perform the actions of the methods.

One general aspect includes a method of verifying operation of a tool for subterranean operations. The method also includes a sensor assembly proximate to a body of a pulser of a logging tool; waking up the logging tool outside of a drill collar; detecting operation of the pulser, via the sensor assembly, in response to waking the logging tool; emulating pressure pulses from the pulser by converting, via the sensor assembly, the detected pulser operation into synthetic pressure pulses; transmitting the synthetic pressure pulses to a data acquisition computer; comparing, via the data acquisition computer, the synthetic pressure pulses to expected pressure pulses stored in a database; and determining a score for the logging tool based on the comparing. Other embodiments of this aspect include corresponding computer systems, apparatus, and computer programs recorded on one or more computer storage devices, each configured to perform the actions of the methods.

One general aspect includes a method of verifying operation of a tool for subterranean operations. The method also includes a sensor assembly proximate to a body of a pulser of a logging tool; rotating the logging tool outside of a drill collar; detecting operation of the pulser, via the sensor assembly, in response to rotating the logging tool; emulating pressure pulses from the pulser by converting, via the sensor assembly, the detected pulser operation into synthetic pressure pulses; transmitting the synthetic pressure pulses to a data acquisition computer; comparing, via the data acquisition computer, the synthetic pressure pulses to expected pressure pulses stored in a database; and determining a score for the logging tool based on the comparing. Other embodiments of this aspect include corresponding computer systems, apparatus, and computer programs recorded on one or more computer storage devices, each configured to perform the actions of the methods.

One general aspect includes a method of verifying operation of a tool for subterranean operations. The method also includes a sensor assembly proximate to a body of a pulser of a logging tool; tilting the logging tool, while outside of a drill collar, to an angle between horizontal and vertical; detecting operation of the pulser, via the sensor assembly, in response to tilting the logging tool; emulating pressure pulses from the pulser by converting, via the sensor assembly, the detected pulser operation into synthetic pressure pulses; transmitting the synthetic pressure pulses to a data acquisition computer; comparing, via the data acquisition computer, the synthetic pressure pulses to expected pressure pulses stored in a database; and determining a score for the logging tool based on the comparing. Other embodiments of this aspect include corresponding computer systems, apparatus, and computer programs recorded on one or more computer storage devices, each configured to perform the actions of the methods.

One general aspect includes a system for testing operation of a tool used for subterranean operations. The system also includes a logging tool that may include a pulser, where the logging tool is outside a wellbore; and a sensor assembly that is configured to detect, via one or more sensors, a change in a parameter of a detectable object in the pulser when the logging tool operates the pulser. Other embodiments of this aspect include corresponding computer systems, apparatus, and computer programs recorded on one or more computer storage devices, each configured to perform the actions of the methods.

One general aspect includes a method for testing operation of a tool used for subterranean operations. The method also includes operating a pulser of a logging tool outside of a bottom hole assembly; detecting operation of the pulser via one or more sensors of a sensor assembly; and emulating pressure pulses from the pulser by converting, via the sensor assembly, the detected operation of the pulser into synthetic pressure pulses. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein:

FIG. 10 is a representative flow chart of a method to test the operation of one or more components of a logging tool 100 outside a wellbore, in accordance with certain embodiments.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", "substantially" or "generally" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

As used herein, "tubular" refers to an elongated cylindrical tube and can include any of the tubulars manipulated around a rig, such as tubular segments, tubular stands, tubulars, and tubular string. Therefore, in this disclosure, "tubular" is synonymous with "tubular segment," "tubular stand," and "tubular string," as well as "pipe," "pipe segment," "pipe stand," "pipe string," "casing," "casing segment," or "casing string."

Figure 1:
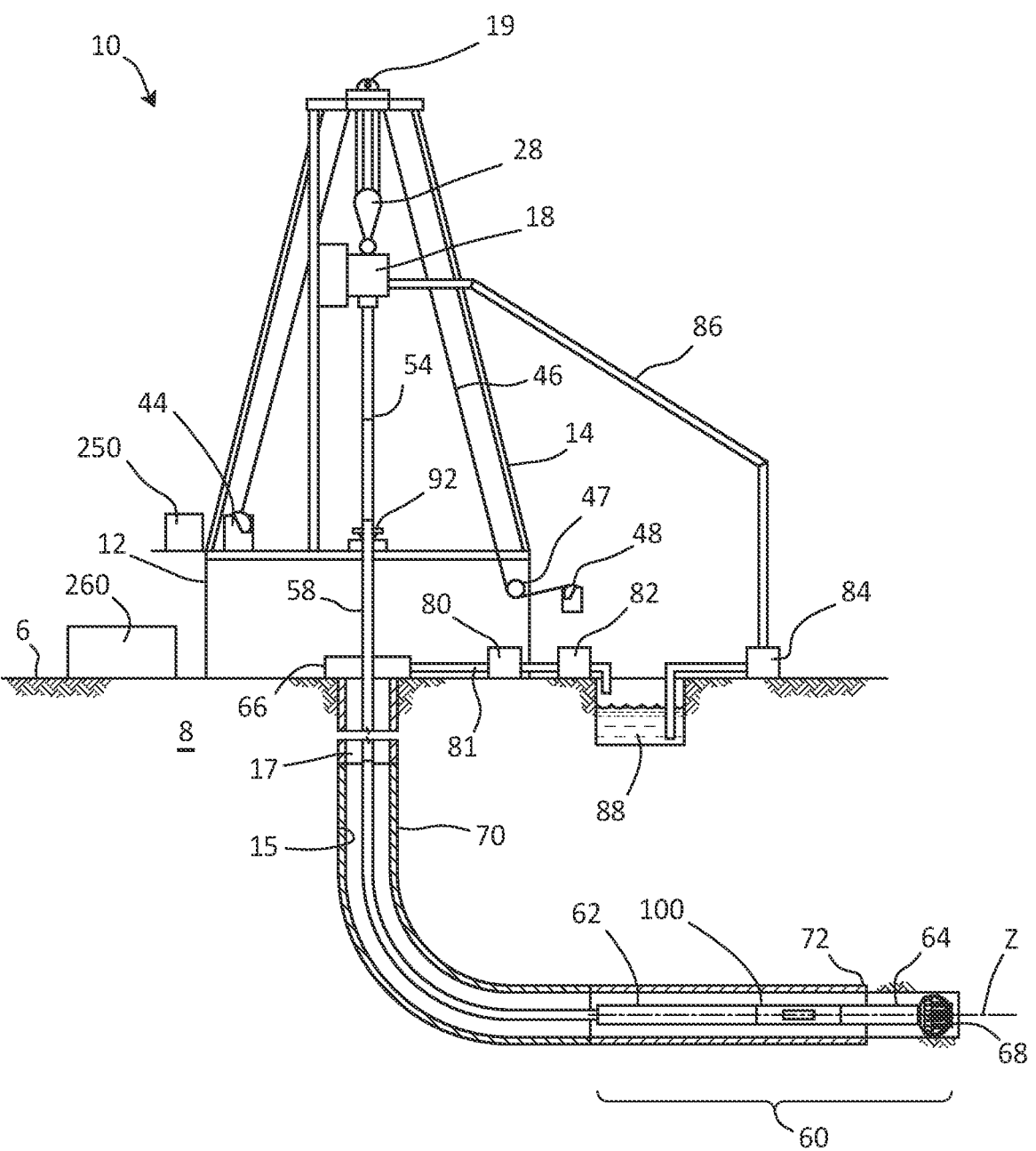
FIG. 1 is a representative simplified partial cross-section front view of a rig being utilized for a subterranean operation, in accordance with certain embodiments.

FIG. 1 is a representative partial cross-sectional front view of a rig 10 being used to drill a wellbore 15 in a subterranean formation 8. FIG. 1 shows a land-based rig, but the principles of this disclosure can equally apply to off-shore rigs, as well, where "off-shore" refers to a rig with water between the rig floor and the earth surface 6. Rig 10 can include a top drive 18 with a drawworks 44, sheaves 19, traveling block 28, anchor 47, and reel 48 used to raise or lower the top drive 18 via cable 46. A derrick 14 extending from the rig floor, can provide the structural support of the rig equipment for performing subterranean operations (e.g., drilling, treating, completing, producing, testing, etc.). The rig can be used to extend a wellbore 15 through the subterranean formation 8 by using a drill string 58 having a Bottom Hole Assembly (BHA) 60 at its lower end. The BHA 60 can include a drill bit 68 and multiple drill collars 62, with one or more of the drill collars including a logging tool 100 for Logging While Drilling (LWD) or Measuring While Drilling (MWD) operations. During drilling operations, drilling mud can be pumped from the surface 6 into the drill string 58 (e.g., via pumps 84 supplying mud to the top drive 18 via the standpipe 86) to cool and lubricate the drill bit 68 and to transport cuttings to the surface via an annulus 17 between the drill string 58 and the wellbore 15.

The returned mud can be directed to the mud pit 88 from a rotating control device 66, through the flow line 81, to the shaker 80. A fluid treatment 82 can inject additives as desired to the mud to condition the mud appropriately for the current well activities and possibly future well activities as the mud is being pumped to the mud pit 88. Pump 84 can pull mud from the mud pit 88 and drive it to the top drive 18, via standpipe 86, to continue circulation of the mud through the drill string 58.

The tubular string 58 can extend into the wellbore 15, with the wellbore 15 extending through the surface 6 into the subterranean formation 8. With a segmented tubular string 58, when tripping the tubular string 58 into the wellbore 15, tubulars 54 are sequentially added to the tubular string 58, e.g., via a top drive 18 and slips 92 that corporate together to extend the length of the tubular string 58 into the subterranean formation 8. When the tubular string 58 is a wireline or coiled tubing, the tubular string 58 can be uncoiled from a spool and extended into the wellbore 15. With the segmented tubular string 58, when tripping the tubular string 58 out of the wellbore 15, tubulars 54 are sequentially removed from the tubular string 58 to reduce the length of the tubular string 58 extending into the subterranean formation 8. With a wireline or coiled tubing tubular string 58, the tubular string 58 can be coiled onto a spool when being pulled out of the wellbore 15.

The wellbore 15 can have casing string 70 installed in wellbore 15 and extending down to a casing shoe 72. The portion of the wellbore 15 with the casing string 70 installed, can be referred to as a cased wellbore. The portion of the wellbore 15 below the shoe 72, without casing, can be referred to as an "uncased" or "open hole" wellbore.

A rig controller 250 can be used to control rig 10 operations including controlling various rig equipment, such as a pipe handler, the top drive 18, an iron roughneck, fingerboard equipment, imaging systems, various other robots on the rig 10 (e.g., a drill floor robot), or rig power systems 260. The rig controller 250 can control the rig equipment autonomously (e.g., without periodic operator interaction), semi-autonomously (e.g., with limited operator interaction such as initiating a subterranean operation, adjusting parameters during the operation, etc.), or manually (e.g., with the operator interactively controlling the rig equipment via remote control interfaces to perform the subterranean operation).

The rig controller 250 can include one or more processors with one or more of the processors distributed about the rig 10, such as in an operator's control hut, in a pipe handler, in an iron roughneck, in a vertical storage area, in the imaging systems, in various other robots, in the top drive 18, at various locations on the rig floor 16 or the derrick 14 or the platform 12, at a remote location off of the rig 10, at downhole locations, etc. It should be understood that any of these processors can perform control or calculations locally or can communicate to a remotely located processor for performing the control or calculations. Each of the processors can be communicatively coupled to a non-transitory memory, which can include instructions for the respective processor to read and execute to implement the desired control functions or other methods described in this disclosure. These processors can be coupled via a wired or wireless network.

The rig controller 250 can collect data from various data sources around the rig and downhole (e.g., sensor data via mud pulse telemetry) and from remote data sources (e.g., suppliers, manufacturers, transporters, company men, remote rig reports, etc.) to monitor and facilitate the execution of the subterranean operation.

During subterranean operations, such as drilling, various logging operations are generally performed to collect and store sensor data for later processing to provide visualization of parameters and characteristics of the wellbore and its surroundings. The processing can be performed by the rig controller 250 during the subterranean operation or after the subterranean operation is complete. A logging tool 100 can be included in the BHA 60 (or otherwise included in the tubular string 58) for performing logging or measuring operations at various times during the operation, or during the operation. Logging tool 100 can have a center longitudinal axis Z, which can also correspond to the longitudinal axis of the BHA 60. Some of the logging/measuring operations can be to collect downhole sensor data of the wellbore 15 while the tubular string 58 is being rotated (such as for drilling, reaming, etc.). The downhole sensor data can be communicated to the surface via mud pulse telemetry where a pulser, incorporated into the BHA, can generate a series of pressure pulses in the drilling mud that can be detected at the surface and decoded to retrieve the sensor data.

Due to the complexity of the BHA and the importance of the operation of the BHA when lowered downhole into the wellbore 15, detecting failures or potential failures of the logging tool 100, prior to it being installed in the BHA and lowered into the wellbore 15, can prevent significant rig down time that may be caused by discovering the failure during operation of the BHA downhole. The current disclosure provides a novel approach to testing some (if not all) of the functions of a logging tool 100 prior to installation in a drill collar of a BHA.

Figure 2:
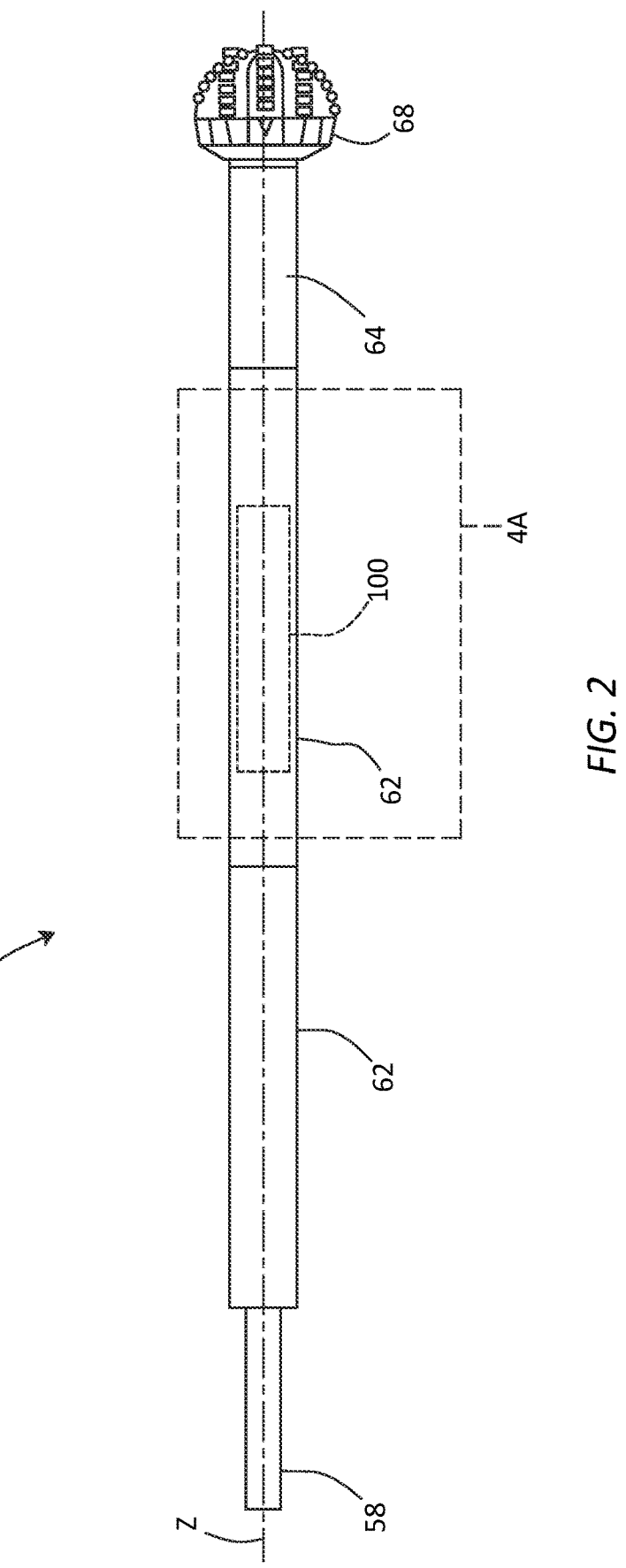
FIG. 2 is a representative simplified side view of a BHA with at least one logging tool contained within a drill collar, in accordance with certain embodiments.

FIG. 2 is a representative simplified side view of a BHA with at least one logging tool 100 contained within a drill collar 62, according to certain embodiments. The BHA 60 can include a drill bit 68 at the bottom end with a mud motor 64 for rotating the drill bit 68 during slide drilling or directional drilling operations. One or more drill collars 62 can be attached to the mud motor 64 or the drill bit 68 (if a mud motor 64 is not utilized), with one or more of the drill collars containing a logging tool 100 and connected to a lower end of the tubular string 58.

The logging tool 100 can be used to generate sensor data representative of a toolface of the logging tool 100, the inclination of the logging tool 100, the azimuthal orientation of the logging tool 100, the amount of gamma radiation being detected by the logging tool 100, parameters of the surrounding formation, pressure or temperature sensed by the logging tool 100, forces acting on the logging tool 100 or tubular string 58, and any other parameter sensed by the logging tool 100, and then transmitting a representation of the sensed data via mud pulse telemetry to the surface for further processing.

Figure 3:
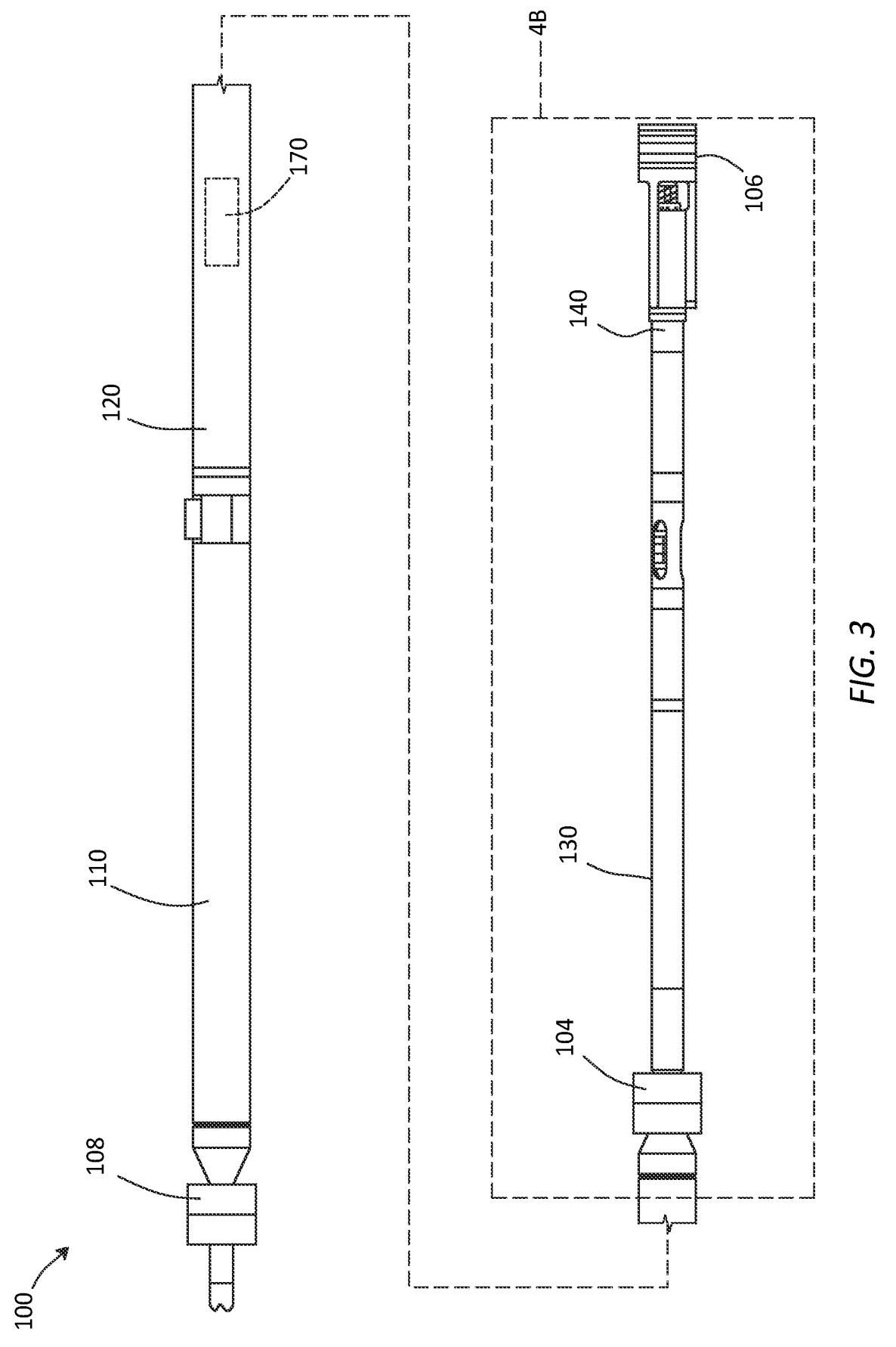
FIG. 3 is a representative side view of a logging tool shown outside of a drill collar, in accordance with certain embodiments.

FIG. 3 is a representative perspective side view of a logging tool 100 shown outside of a drill collar 62, in accordance with certain embodiments, such as before the logging tool 100 is installed in the drill collar 62. In a certain embodiment, the logging tool 100 can include a battery stack 110 for powering the logging tool 100 with an electronics package 120 installed between the battery stack 110 and the pulser 130. The lower end 140 can be used to seat the logging tool 100 in the drill collar 62 by engaging the lower end centralizer 106 with the interior surface of the drill collar 62. Centralizers 104, 108 can also be utilized to center the logging tool 100 in a drill collar 62.

Sensor data can be collected by the electronics package 120 from one or more sensor systems 170 in the logging tool 100 and communicated to the pulser for transmission of the sensor data (or at least a representation of the sensor data) via pressure pulses created in the mud as the mud flows through the logging tool 100 during downhole operations. The sensor system 170 can be an inclination sensor system that collects data to determine the inclination of the logging tool 100, a toolface sensor system that collects data to determine a toolface or an azimuthal orientation of the logging tool 100, an azimuthal sensor system that collects data to determine an azimuthal orientation of the logging tool 100, a pressure or temperature sensor system that collects data on the pressure and temperature internal or external to the logging tool 100, a vibration sensor system that collects vibration signals (such as acoustic signals) communicated to or from the logging tool 100, a gamma ray detection system that measures formation properties, a formation measurement system that measures formation properties or parameters, and a strain gauge sensor system that measures torque or other forces in the tubular string 58.

The pressure pulses can be created by a motor rotating a valve (or extending a shaft, or any other actuation that can actuate a valve) that selectively closes or opens a fluid flow path, thereby disrupting the flow of the fluid through the valve and creating a pressure pulse. As is known in the art, the pressure pulse can be a positive pressure pulse or a negative pressure pulse. The pressure pulses can form a pulse train of ON and OFF pressure pulses in the drilling fluid (or drilling mud) that, when the logging tool 100 is downhole, it can be used to transmit sensor data and any other data type (such as command/control data, program data, initialization parameters, etc.) to the surface for processing.

The logging tool 100 can be put in a sleep mode when assembly is completed at the surface, and then the logging tool 100 can wake up when it is being oriented for installation downhole. For example, if the logging tool 100 is oriented vertically, then it may wake up because it may be configured to turn ON when being assembled at well center for entering the wellbore 15. In other configurations, the logging tool 100 may stay in sleep mode until it is installed downhole in the wellbore 15 and may turn ON when it senses flow of drilling fluid (e.g., via vibrations in the drill string or another sensed parameter, such as acoustic signals, temperature downhole, pressure downhole, etc.). When the logging tool 100 turns ON, it may indicate its state by sending one or more pressure pulses to the surface. The surface equipment can receive and interpret the pressure pulses and confirm that the logging tool 100 is turned ON.

In normal operation after being turned ON or awakened, the logging tool 100 can begin communicating sensor data to the surface or receiving data from the surface (e.g., when the electronic package 120 includes a mud pulse receiver) while the tubular string 58 is drilling the wellbore 15.

The current disclosure provides a device that can enable testing operations of the logging tool 100 at the surface prior to the logging tool 100 being installed in a drill collar 62. The device can enable testing operational performance of the sensor systems, the electronics package 120, the pulser 130, and other aspects of the logging tool 100 before the tool is installed in a drill collar and then installed in the wellbore 15. Specifically, a sensor assembly 200 can sense a detectable object in the pulser 130 that changes a parameter each time a pressure pulse is intended to be created by the pulser. However, since the logging tool 100 is out of the wellbore 15 during the testing, it doesn't actually create a pressure pulse. The sensor assembly 200 detects the changes to the parameter and can convert the changes to emulated pressure pulses and transmit the emulated pressure pulses to surface equipment that can receive and analyze the emulated pressure pulses. Therefore, the emulated pressure pulses will also communicate the message the pulser intended to create as if it were downhole, and the surface equipment can compare the message with an expected message to determine if the pulser is working correctly or if failures are occurring or will be occurring.

Figure 4A:
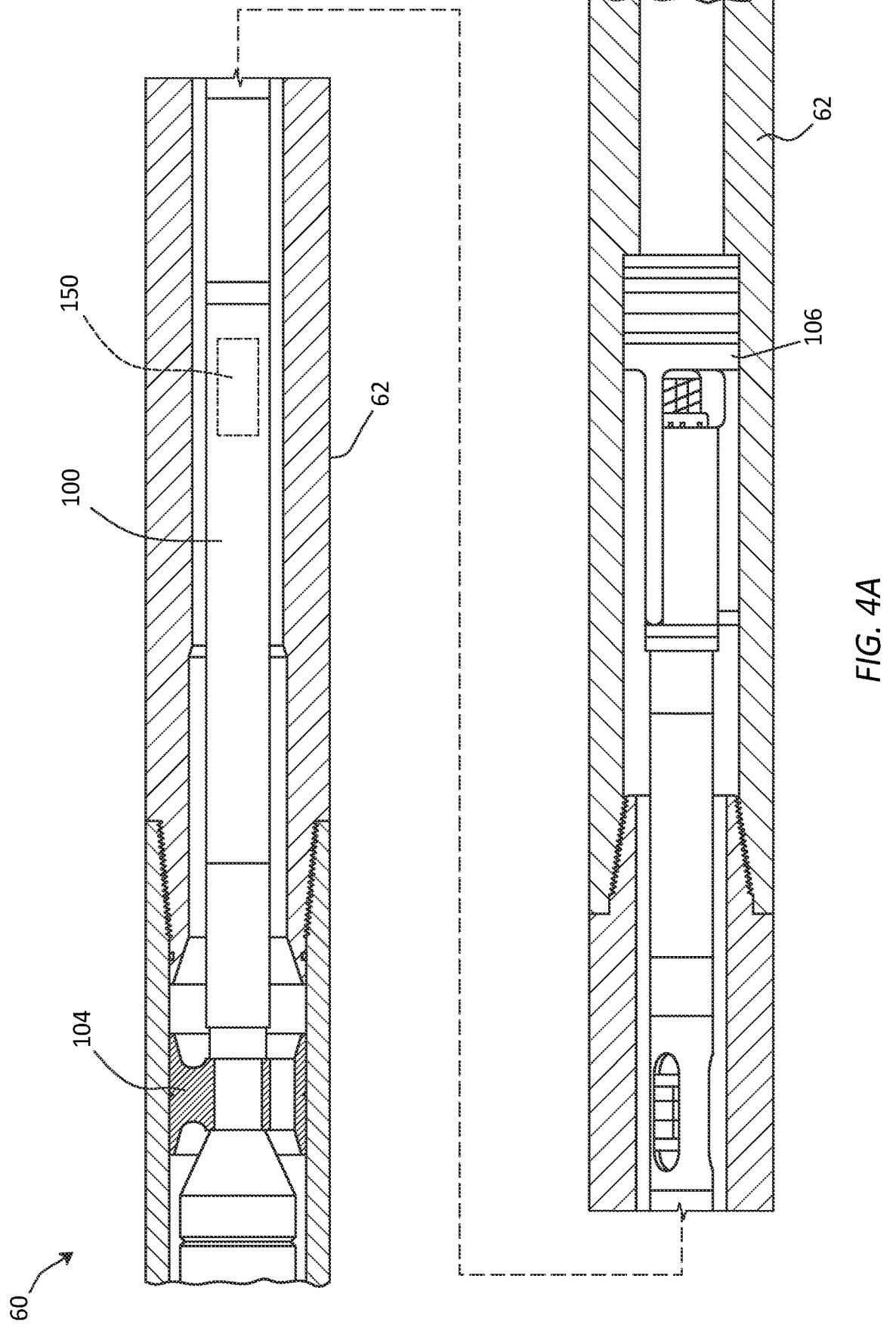
FIG. 4A is a representative partial cross-sectional view, of a pulser disposed in a drill collar, in accordance with certain embodiments.

FIG. 4A is a representative partial cross-sectional view of a pulser 130 disposed in a drill collar 62, in accordance with certain embodiments. FIG. 4A is a detailed view of the area shown in FIG. 2. This shows how the pulser portion of the logging tool 100 can be installed in a drill collar 62 for assembly in a BHA 60. The pulser 130 can include a detectable object 150 that is moved each time the pulser 130 creates a pressure pulse.

Figure 4B:
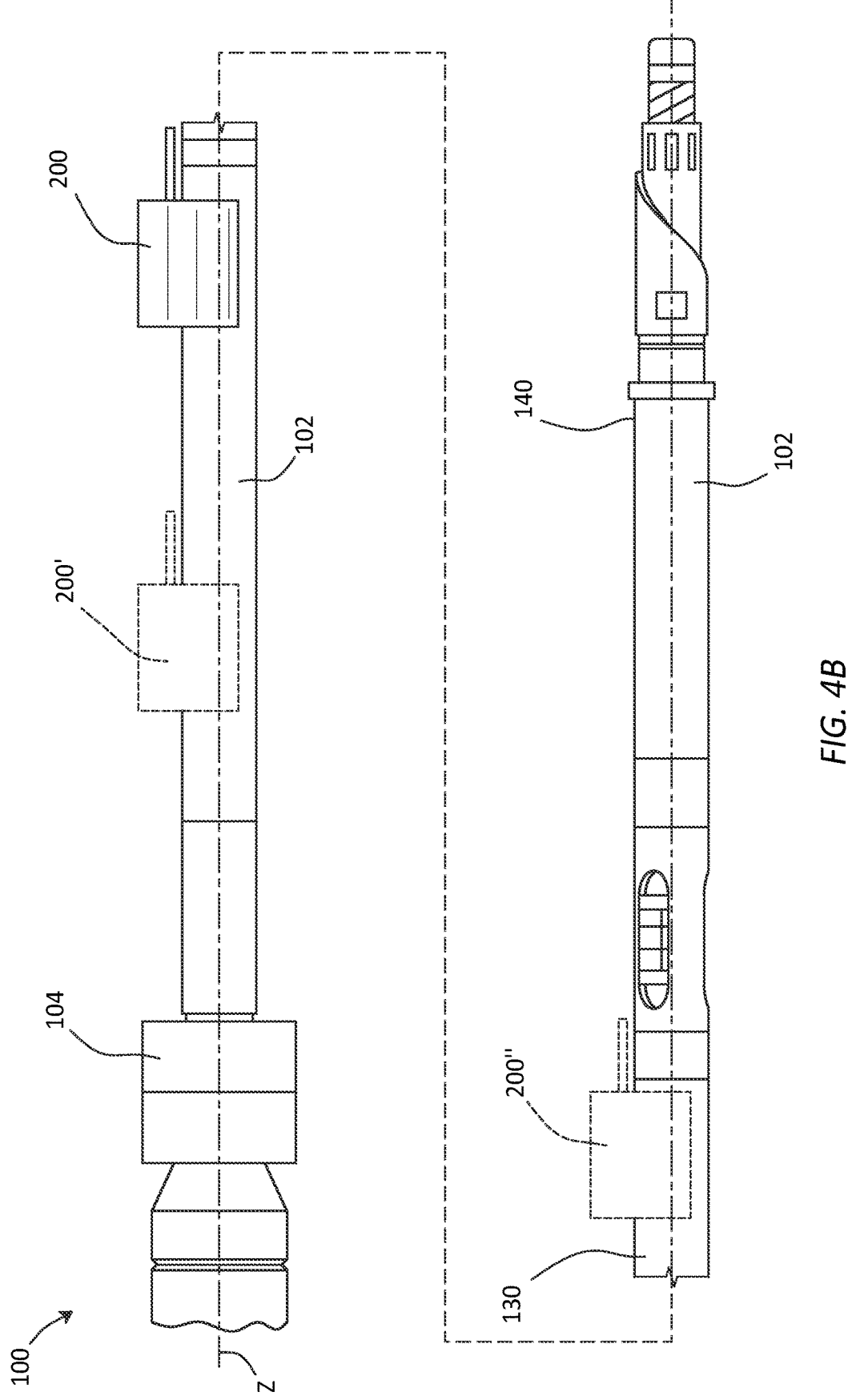
FIG. 4B is a representative side view of the pulser of FIG. 4A shown outside of a drill collar with a sensor assembly attached to the pulser to verify operations of a logging tool while being outside of a wellbore, in accordance with certain embodiments.

FIG. 4B is a representative side view of the pulser 130 of FIG. 4A shown outside of a drill collar 62 with a sensor assembly 200 attached to the pulser 130 to verify operations of a logging tool 100 while the logging tool is outside of a wellbore 15, in accordance with certain embodiments. The sensor assembly 200 can be removably attached to any number of positions on the body 102 of the pulser 130, such as locations 200' and 200". In general, the sensor assembly 200 is desirably placed on the body 102 in close proximity with a detectable object 150, which can be internal to the pulser 130, and can be detected by a sensor in the sensor assembly 200. The detectable object 150 can be a motor, a movable metal object, a moveable magnetized object, a moveable magnet, a stationary or moveable coil, or combinations thereof.

Figure 5:
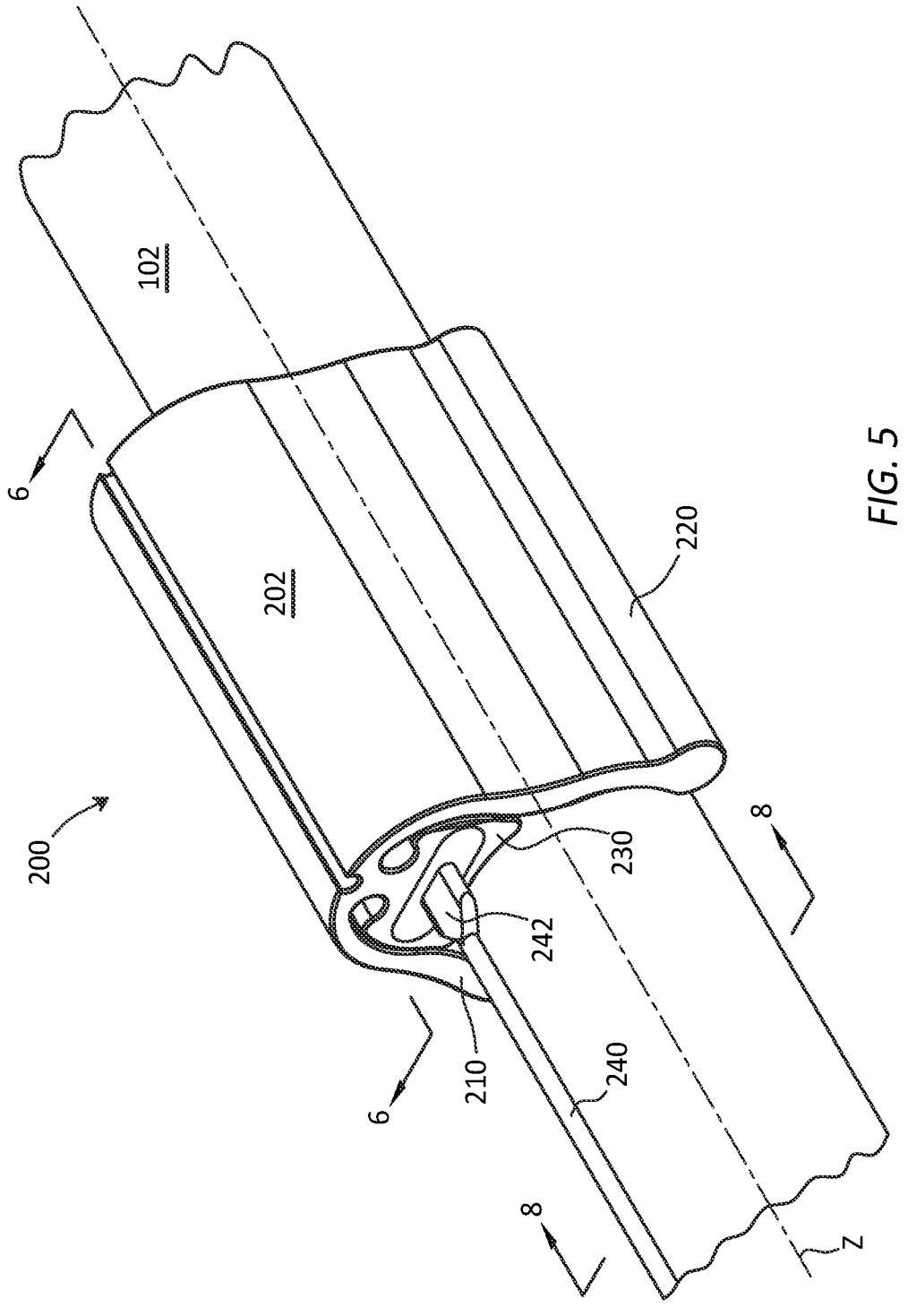
FIG. 5 is a representative perspective view of a sensor assembly removably mounted to a pulser, in accordance with certain embodiments.

FIG. 5 is a representative perspective view of a sensor assembly 200 removably mounted to a body 102 of a pulser 130, in accordance with certain embodiments. In a certain embodiment, the sensor assembly 200 can include pliable left and right arms 210, 220 that can bend outward to allow the left and right arms 210, 220 to extend past opposite sides of the pulser body 102. The sensor assembly 200 can be pushed onto the body 102 until the center portion 230 engages the body 102 and prevents further inward radial motion of the sensor assembly 200 relative to the body 102. The radial bending of the left and right arms 210, 220 away from each other when they are forced to extend past opposite sides of the body 102 can store up energy in the left and right arms 210, 220 which can act to retain the sensor assembly 200 on the body 102 until enough radial force is applied to the sensor assembly 200 to remove the sensor assembly 200 from the body 102. A communication cable 240 can be connected to the electronics via the connector 242. This connector 242 can be any connector that is suitable for communicatively coupling an electronics assembly to the surface equipment (such as a data acquisition computer 162, see FIG. 9). For example, the connector 242 can be a universal serial bus (USB) type connector.

However, it should be understood that the cable 240 or connector 242 may not be needed in certain embodiments, such as when the communication to the DAC 162 is performed wirelessly (e.g., via Bluetooth telemetry, wireless ethernet telemetry, etc.).

Figure 6:
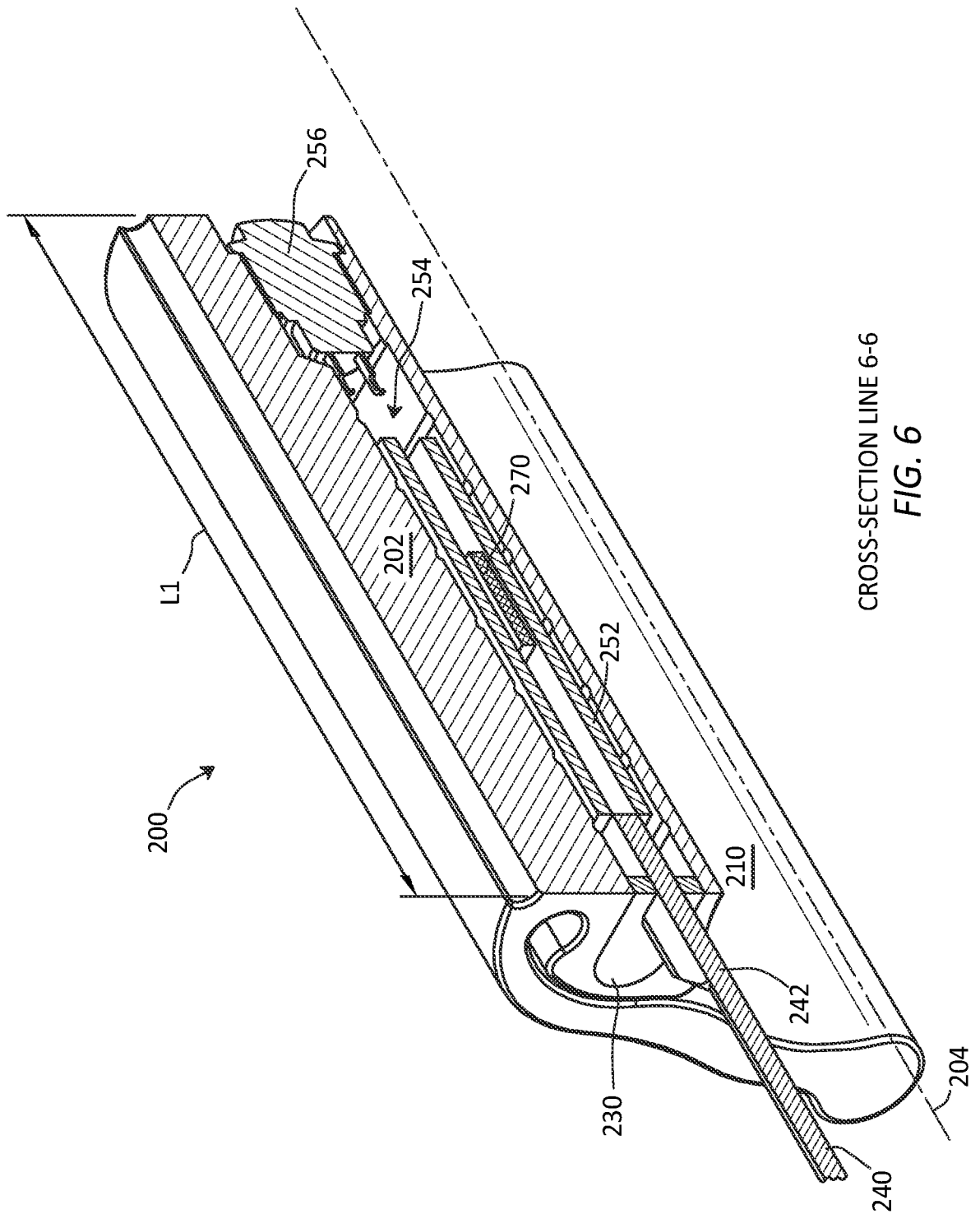
FIG. 6 is a representative partial cross-sectional view along cross-section line 6-6, as indicated in FIG. 5, of a sensor assembly, in accordance with certain embodiments.

FIG. 6 is a representative partial cross-sectional view along cross-section line 6-6, as indicated in FIG. 5, of a sensor assembly 200, in accordance with certain embodiments. In a certain embodiment, the center portion 230 can include a cavity 254 that can contain an electronics assembly 252, which can include a printed circuit board with one or more sensors and electronics mounted thereon, or a cell phone can be mounted in the cavity 254 as an alternative to (or in addition to) the electronics assembly 252. The cell phone can include a novel application that detects, via sensors in the cell phone, the change in the detectable object and communicates synthetic pressure pulses to the DAC 162 via Bluetooth telemetry. The cavity can extend along the overall axial length L1 of the sensor assembly 200. However, it is not a requirement that the cavity 254 extend the full length L1 of the sensor assembly 200. The cavity could extend a partial axial distance along the sensor assembly 200. The electronics assembly 252 can include one or more sensors 270 that can detect a change of the detectable object 150 in the pulser 130.

The one or more sensors 270 can be any of an acoustic sensor, a vibration sensor, a magnetometer, a Hall effect sensor, a magneto-diode, a magneto-transistor, magneto-optical sensor, a Lorentz force based Micro Electro-Mechanical System (MEMS) sensor, an electron tunneling based MEMS sensor, a MEMS compass, nuclear precession magnetic field sensor, optically pumped magnetic field sensor, a search coil magnetic field sensor, or combinations thereof. The one or more sensors 270 (which can also be referred to as sensor 270) can detect a change in a parameter of a detectable object in the pulser, where the parameter is one of a position of the detectable object, an orientation of the detectable object, a magnetic field of the detectable object, an acoustic signal from the detectable object, or a combination thereof. The electronics assembly 252 can also comprise a cell phone with the sensor 270 contained within the cell phone.

It should be understood that it is not a requirement that the cell phone, when used for the electronics assembly 252, be mounted in the cavity 254. The cell phone can be strapped to the pulser 130 (e.g., via tape, tie wraps, bands, string, etc.) such that the body of the cell phone is proximate to the pulser 130. The cell phone does not have to be in contact with the pulser 130 body 102, but it can be in contact with the body 102 in certain embodiments. The cell phone can also be resting on the pulser body 102 to sense the change in the detectable object 150 or placed proximate the pulser body 102 such that it can detect the change in the detectable object 150 without being directly coupled to the pulser body 102.

It should also be understood that the electronics assembly 252 can comprise a smart watch that has been configured to sense the change in the detectable object and wirelessly communicate the synthetic pressure pulses to the DAC 162. The smart watch can be strapped directly to the body 102, rested on the body 102 without strapping, or it can be disposed in the cavity 254.

A pushbutton 256 can be used to put the electronics assembly 252 into different operating modes, such as a firmware update mode. The pushbutton 256 can be used to cycle through the modes. However, in certain embodiments, a pushbutton 256 may not be used and the modes can be selected by communication from the DAC 162. The body 202 of the sensor assembly 200 can be made from a non-magnetic material (e.g., plastics) or a substantially non-magnetic material where the sensor 270 (e.g., a magnetometer) is not shielded and can sense external magnetic fields, such as fields produced by changing a parameter of the detectable object 150 of the pulser 130. Since the pulser 130 repeats its change of the detectable object 150 each time it opens/closes a valve to create a pressure pulse, a pattern of the parameter change (e.g., a magnetic field change) can be recognized and converted by a controller of the electronics assembly 252 into synthetic pressure pulses to emulate signals/pulses generated by a pulser 130 if the pulser 130 were downhole. It should also be understood that the body can be made from magnetic materials when the sensor 270 is not a magnetic field sensor (e.g., a magnetometer), such as when the sensor 270 is an acoustic sensor or vibration sensor.

Figure 7:
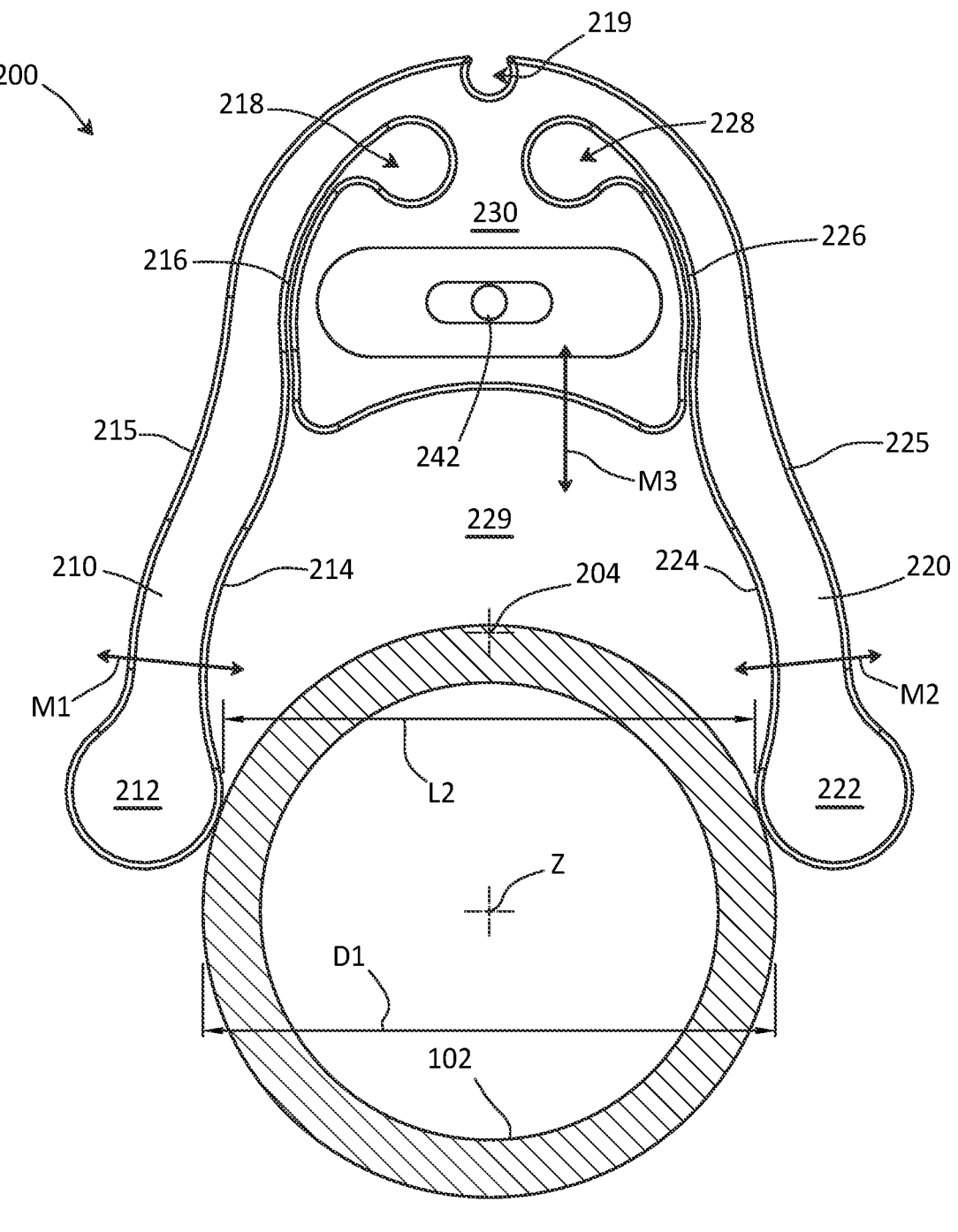
FIG. 7 is a representative end view of a sensor assembly prior to being removably attached to a body of the pulser, in accordance with certain embodiments.

FIG. 7 is a representative end view of a sensor assembly 200 prior to it being removably attached to a body 102 of the pulser 130, in accordance with certain embodiments. As used herein in reference to FIGS. 7 and 8, terms such as up, upper, top, down, lower, bottom, left, right, or side are relative terms as viewed in FIGS. 7 and 8. Therefore, top refers to a feature that is towards the top of the figure, bottom refers to a feature that is towards the bottom of the figure, left refers to a feature that is towards the left of the figure, and right refers to a feature that is towards the right of the figure. The references still apply even if the actual tool were rotated upside down or to the left or right. These relative terms are merely used to assist in understanding the description as related to the items in the figures. They are not intended to limit the scope of the claims.

In a certain embodiment, the sensor assembly 200 can include a body 202 that includes a left arm 210, a right arm 220, and a center portion 230. The left arm 210 can extend downward past a left side of the center portion 230 forming a void 218 near the top of the left arm and the top of the center portion 230, and forming a gap 216 between the left arm and a left side of the center portion 230. The right arm 220 can extend downward past a right side of the center portion 230 forming a void 228 near the top of the right arm and the top of the center portion 230, and forming a gap 226 between the right arm and the right side of the center portion 230. The left and right arms 210, 220 and the center portion 230 form an opening 229 into which the body 102 of the pulser 130 can be received.

The voids 218, 228 can provide stress relief for the body 202 to enable radial rotation (arrows M1 and M2) of the left and right arms 210, 220, respectively. This size of the voids 218, 228 can be tailored to control bending forces at the top of the left and right arms 210, 220 as they are rotated. When the left and right arms 210, 220 move radially (arrows M1 and M2, respectively), the width of gaps 216 and 226 can vary and the distance L2 between the left and right arms 210, 220 can also vary. The body 202 can include a void 219 that is formed along the top of the body 202. This size of the void 219 can also be tailored to control bending forces at the top of the left and right arms 210, 220 as they are rotated.

The left arm 210 can form a contour that includes an outer surface 215, an enlarged end 212, and an inner surface 214. The contour is formed to provide a desired thickness of the arm that can support intended forces applied in operation, such as radial change of the left arm 210 and a retention force used to secure the sensor assembly 200 to the body 102. The inner surface 214 can be formed with a radius portion that generally aligns with an outer surface of the body 102, which has an outer diameter D1. The inner surface 214 can also be formed to generally align with a left side of the center portion 230 to form a gap 216, which can be a zero "0" width if the left arm 210 is rotated into contact with the left side of the center portion 230. The transition between the inner surface 214 and the outer surface 215 can form an enlarged end 212, which can provide increased durability of the end of the left arm 210 and increased retention strength for retaining the body 102 in the opening 229 of the sensor assembly 200.

The right arm 220 can form a contour that includes an outer surface 225, an enlarged end 222, and an inner surface 224. The contour is formed to provide a desired thickness of the arm that can support intended forces applied in operation, such as radial change of the right arm 220 and a retention force used to secure the sensor assembly 200 to the body 102. The inner surface 224 can be formed with a radius portion that generally aligns with an outer surface of the body 102, which has an outer diameter D1. The inner surface 224 can also be formed to generally align with a right side of the center portion 230 to form a gap 226, which can be a zero "0" width if the right arm 220 is rotated into contact with the right side of the center portion 230. The transition between the inner surface 224 and the outer surface 225 can form an enlarged end 222, which can provide increased durability of the end of the right arm 220 and increased retention strength for retaining the body 102 in the opening 229 of the sensor assembly 200.

In certain embodiments, when the sensor assembly 200 is moved radially toward the body 102 (arrows M3), the enlarged ends 212, 222 can engage the outer surface of the body 102. As the sensor assembly 200 is further moved radially toward the body 102, the curved outer surface of the body 102 will cause the left and right arms 210, 220 to be rotated radially outward away from the body 102, while the enlarged ends 212, 222 remain engaged with the outer surface of the body 102. As the sensor assembly 200 is moved closer to the body 102, the left and right arms 210, 220 reach their max separation (i.e., distance L2 generally equals the outer diameter D1) to receive the body 102 and then begin to move back toward each other as the distance L2 decreases to be less than the distance of the outer diameter D1. As the sensor assembly 200 is moved even closer to the body 102, the center portion 230 can engage the top outer surface of the body 102 and can prevent further movement toward the body 102, as is shown in FIG. 8.

Figure 8:
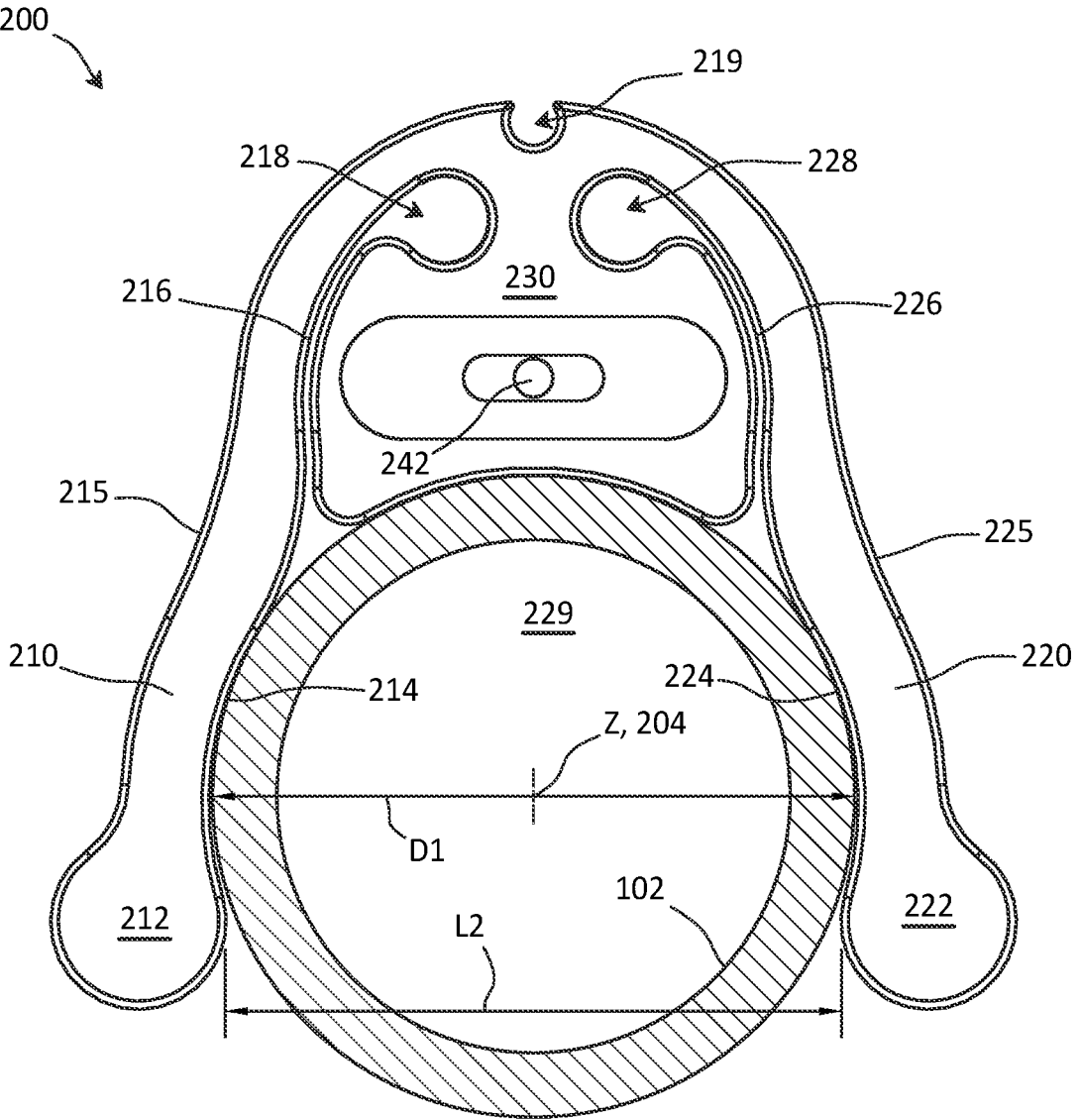
FIG. 8 is a representative partial cross-sectional view along cross-section line 8-8, as indicated in FIG. 5, of a sensor assembly removably mounted to tubular body of a pulser, in accordance with certain embodiments.

FIG. 8 is a representative partial cross-sectional view along cross-section line 8-8, as indicated in FIG. 5, of a sensor assembly 200 removably mounted to the body 102 of a pulser 130, in accordance with certain embodiments. With the center portion 230 engaged with the top of the body 102, and the left and right arms 210, 220 positioned on opposite sides of the body 102, the enlarged ends 212, 222 can be positioned below the center axis Z of the body 102, such that the distance L2 between the enlarged ends 212, 222 is smaller than the outer diameter D1 of the body 102. The inner surfaces 214, 224 as well as the bottom surface of the center portion 230 can be generally aligned with the outer surface of the body 102 with the central axis 204 of the opening 229 and the center axis of the body 102 are generally aligned with each other. However, it is not required that the central axis 204 of the opening 229 and the center axis of the body 102 be aligned. They can be generally parallel with each other but offset from each other.

As long as the enlarged ends 212, 222 are below the center axis Z of the body 102, then the sensor assembly 200 tends to remain attached to the body 102. With the enlarged ends 212, 222 further down below the center axis Z of the body 102, then the force required to remove the sensor assembly 200 tends to be increased. The energy required to rotate the arms 210, 220 radially away from the body 102, causes the sensor assembly 200 to remain engaged with the body 102 until a required removal force is applied, such as an operator pulling the sensor assembly 200 off of the body 102.

Figure 9:
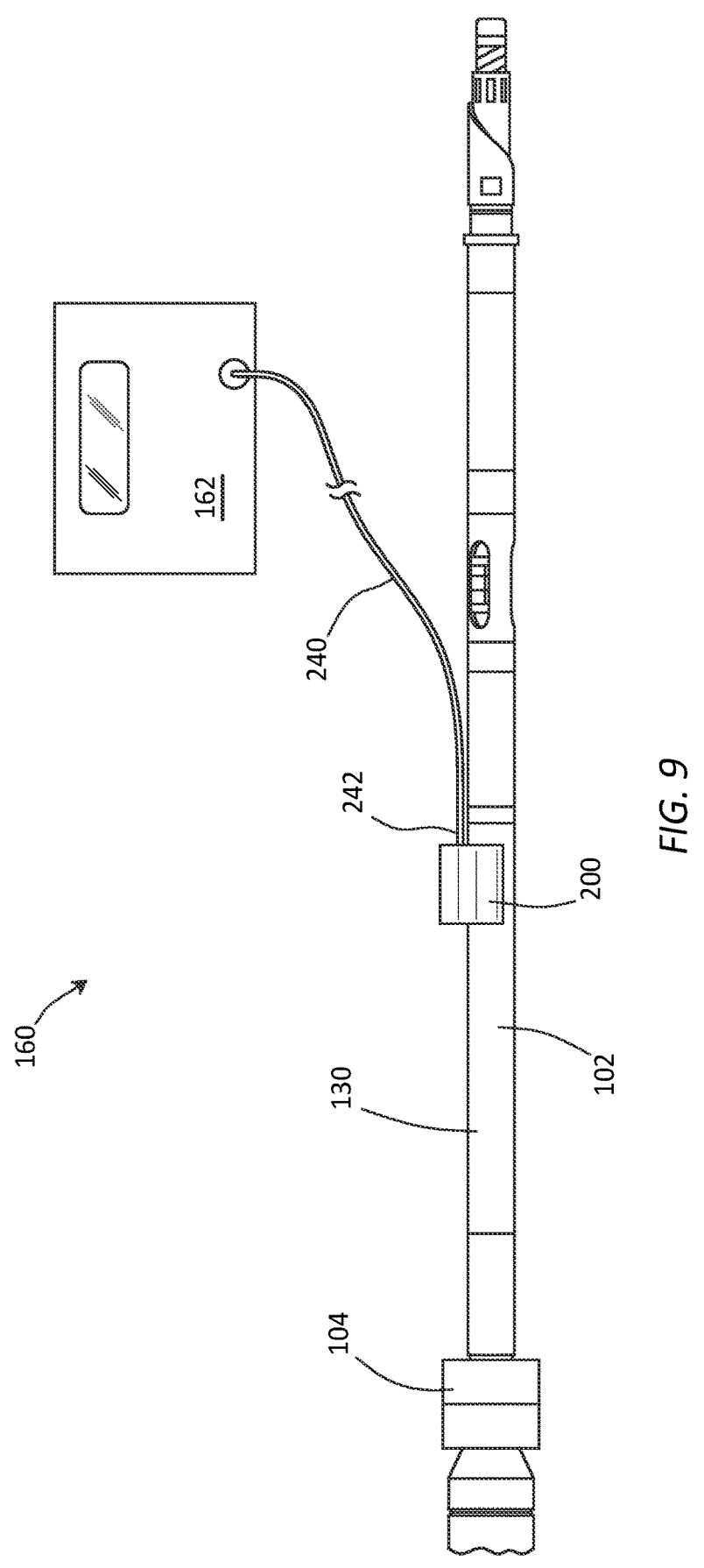
FIG. 9 is a representative side view of a data acquisition system (DAS) with a sensor assembly mounted to a pulser and coupled to a data acquisition computer (DAC), in accordance with certain embodiments.

FIG. 9 is a representative side view of a data acquisition system (DAS) 160 with a sensor assembly 200 mounted to a pulser 130 and coupled to a data acquisition computer (DAC) 162, in accordance with certain embodiments. This can be seen as a test configuration for testing the logging tool 100 prior to assembly into a drill collar 62. The DAC 162 can be communicatively coupled to the sensor assembly 200 via the cable 240 and the connector 242. The DAC 162 can be a test computer that receives emulated mud pulse telemetry from the logging tool 100 via the sensor assembly 200, or the DAC 162 can be the actual surface equipment that is used to receive the mud pulse telemetry from the logging tool 100 when it is placed downhole. The actual surface equipment can receive the emulated mud pulse telemetry from the sensor assembly 200.

Change of the detectable object 150 can be detected by the sensor assembly 200 and can be used to create a simulated pressure pulse train since the detectable object 150 is used by the pulser 130 to generate a pressure pulse in normal downhole operations. The simulated pressure pulse train can be transmitted to the DAC 162 which can receive mud pulse telemetry from the pulser 130 and interpret the mud pulse telemetry. Therefore, the DAC 162 can be used with the sensor assembly 200 to verify operation of the logging tool 100 without requiring the pulser 130 to be downhole or submerged in fluid.

Therefore, the sensor assembly 200 enables verification of logging tool operations while the logging tool is outside the wellbore 15, such as 1) verifying a wake up notification that can be sent to the sensor assembly 200 when the logging tool 100 transitions from sleep mode to an operational mode, 2) verifying gamma ray detection by detecting gamma rays (such as from a known source external to the logging tool 100 or just by reading ambient radiation, which can also be a known source) and transmitting the gamma ray detection data to the sensor assembly 200 via the pulser 130, 3) verifying inclination measurements by tilting the logging tool 100 and the logging tool 100 detecting and transmitting the inclination data to the sensor assembly 200 via the pulser 130, 4) verifying toolface measurements by rotating the logging tool 100 and the logging tool 100 detecting and transmitting toolface data to the sensor assembly 200 via the pulser 130, 5) verifying temperature or pressure measurements by the logging tool 100 sensing the ambient temperature or pressure and transmitting the data to the sensor assembly 200 via the pulser 130, 6) verifying that a wake up of the logging tool 100 can be initiated by vibration of the logging tool 100 by a vibration generator in the sensor assembly 200 and the wake up notification being transmitted to the sensor assembly 200 via the pulser 130, and 7) verifying any other system of the logging tool 100 that uses the pulser 130 to communicate to equipment external to the logging tool 100.

The sensor assembly 200 can also be used to verify that the logging tool 100 generates the desired sequence of reports via the pulser 130. Some logging tools 100 can be configured to send a particular sequence of reports, such as sending inclination data, followed by toolface data, followed by survey data, and then followed by a $2^{nd}$ set of survey data. The logging tool 100 can be configured to generate data transmissions automatically and periodically via mud pulse telemetry in a set sequence of report types. Since the sensor assembly 200 mimics a mud pulse telemetry transmission, then these system wide tests can also be run to verify this level of functionality. These simulated mud pulse telemetry communications can be seen as a particular signature and can be compared to an expected telemetry signature to determine if the logging tool 100 is operating properly. The signatures can be stored in a database and retrieved by the rig controller 250 to perform the comparison.

The integrity of pulses that would have been generated in the drilling fluid by the pulser can also be evaluated by the sensor assembly 200 by sensing the integrity of the motion of the detectable object 150. The motion of the detectable object 150 can be detected by the sensor assembly 200 and compared to a signature of a desired motion. If the motion deviates substantially from the desired signature, then the test system could report that the logging tool 100 should be re-evaluated for integrity issues or sent for repairs. The expected telemetry signatures and the desired signatures can be stored in a signature database in the DAC 162 for comparisons during logging tool 100 testing.

The logging tool 100 tests using the sensor assembly 200 can be carried out as a portion of a final acceptance test prior to installation of the logging tool 100 in a drill collar 62. The results of the test can be included in the acceptance documentation/report that documents the health of the logging tool 100. The DAC 162, which can be running test software and connected to the sensor assembly 200, can produce test reports that can be included in the job run reports. It can show that the logging tool 100 was actually powered and operating, as well as what time it was operated, who was operating it, or how well it operated.

In operation, an MWD operator can quickly snap the sensor assembly 200 to a fully assembled logging tool 100 and test the operation of the logging tool 100 as if it was in the wellbore 15. The sensor assembly 200 replaces the need for a wellbore 15 or fluid in the wellbore 15 to operate the logging tool 100 and enables the logging tool 100 to be tested outside of the wellbore 15, such as in a lab, at the rig site, with the unit in the elements (e.g., rain, snow, sleet, wind, heat, cold, or other environmental conditions) and the test operator in an office (or drillers hut or truck, etc.).

The signal from the sensor assembly 200 (which can emulate a pressure pulse train of a mud telemetry message) will provide a signal to the surface system that represents the mechanical and electrical operation of the pulser 130. This signal will enable diagnostics for the operation of the logging tool 100.

FIG. 10 is a representative flow chart of a method 300 to test the operation of one or more components of a logging tool 100 outside a wellbore 15, in accordance with certain embodiments. In operation 302, the sensor assembly 200 can be attached to the body 102 of the pulser 130, preferable in proximity to a detectable object 150 within the pulser that changes a parameter of the detectable object 150 each time a pressure pulse is to be generated by the pulser 130.

In operation 304, the operator can initiate operation of the logging tool 100 by any of the methods described in this disclosure, such as cause the logging tool 100 to wake up, roll the logging tool 100 to change the toolface, etc. The operation of the logging tool 100 will cause the pulser 130 to attempt to send a message via mud pulse telemetry. However, since there is no fluid in the pulser 130, the pulser 130 will cause the pressure pulse generator (e.g., a pilot valve) to operate without really generating a pressure pulse. In operation 306, since the sensor assembly 200 detects the parameter change of the detectable object 150, then, in operation 308, the sensor assembly 200 can convert the detected parameter change into synthetic pressure pulses to emulate the intended mud pulse telemetry message and transmit it to the DAC 162 for analysis.

In operation 310, the emulated mud pulse telemetry message can be received at the DAC 162 and can be verified by comparing it to an expected mud pulse telemetry message (which can also be referred to as a signature) with the expected mud pulse telemetry messages (or signatures) stored in a database that is communicatively coupled to the processors of the DAC 162. It should be understood that the emulated mud pulse telemetry message can also comprise multiple messages and the comparison can include comparing multiple messages to multiple expected messages. In operation 312, the DAC 162 can determine a score for the emulated message (or emulated messages) to indicate the integrity of the emulated message(s), which can also be related to the integrity of the pulser 130 or other logging tool 100 components.

In operation 314, if the score is below a predetermined level, then, in operation 316, the DAC 162 can send a message to the operator to indicate the score or to indicate any corrective action that may be needed to improve the score to an acceptable level.

In operation 314, if the score is equal to or above the predetermined level, then, in operation 318, the DAC 162 can send a message to the operator to indicate the acceptable score and to confirm that the logging tool 100 is ready for installation in a drill collar 62 and installation into the BHA for deployment downhole. The DAC 162 can include the details of the test (whether passed or failed) in a run report that can be saved as a historical record of the performance of the logging tool 100.

VARIOUS EMBODIMENTS

Embodiment 1. A system for testing operation of a tool used for subterranean operations, the system comprising:
a logging tool that comprises a pulser; and
a sensor assembly positioned proximate to the pulser while the logging tool is outside of a wellbore, wherein the logging tool operates the pulser, and wherein the sensor assembly detects a change in a parameter of a detectable object in the pulser and transmits a signal to a data acquisition computer that is representative of the change in the parameter.

Embodiment 2. The system of embodiment 1, wherein the sensor assembly is removably attached to the pulser.

Embodiment 3. The system of embodiment 1, wherein the signal is transmitted either via a wired or a wireless communication link to the data acquisition computer.

Embodiment 4. The system of embodiment 1, wherein the parameter is one of a position of the detectable object, an orientation of the detectable object, a magnetic field of the detectable object, an acoustic signal from the detectable object, or a combination thereof.

Embodiment 5. The system of embodiment 1, wherein the sensor assembly comprises a sensor that senses the change of the detectable object.

Embodiment 6. The system of embodiment 5, wherein the sensor comprises a cell phone.

Embodiment 7. The system of embodiment 6, wherein the cell phone wirelessly transmits the signal to the data acquisition computer.

Embodiment 8. The system of embodiment 5, wherein the sensor comprises a smart watch.

Embodiment 9. The system of embodiment 8, wherein the smart watch wirelessly transmits the signal to the data acquisition computer.

Embodiment 10. The system of embodiment 5, wherein the sensor assembly further comprises a body; and a cavity inside the body, wherein the sensor is disposed in the cavity.

Embodiment 11. The system of embodiment 10, wherein the sensor comprises a magnetometer, and wherein the body is non-magnetic and the magnetometer detects changes in a magnetic field of the detectable object.

Embodiment 12. The system of embodiment 10, wherein the sensor assembly further comprises an electronics assembly disposed in the cavity, and wherein the sensor is disposed in the electronics assembly.

Embodiment 13. The system of embodiment 12, wherein electronics in the electronics assembly comprise a controller, wherein the controller receives sensor data from the sensor and converts the sensor data to synthetic pressure pulses that emulate pressure pulses from the pulser, and wherein the synthetic pressure pulses are representative of the detected change of the detectable object.

Embodiment 14. The system of embodiment 13, wherein the data acquisition computer receives the synthetic pressure pulses from the sensor assembly and compares the synthetic pressure pulses to a signature in a signature database.

Embodiment 15. The system of embodiment 14, wherein the controller is configured to determine a score of the synthetic pressure pulses based on the comparison.

Embodiment 16. The system of embodiment 15, wherein the score indicates that the logging tool is acceptable for downhole operation or that corrective action for the logging tool is needed.

Embodiment 17. The system of embodiment 1, wherein the signal comprises synthetic pressure pulses that emulate pressure pulses from the pulser, and wherein the data acquisition computer compares the signal to a signature stored in a signature database and establishes a score for the logging tool based on the comparison.

Embodiment 18. The system of embodiment 17, wherein the data acquisition computer is configured to verify operation of a sensor system in the logging tool based on the comparison of the signal to the signature.

Embodiment 19. The system of embodiment 18, wherein the sensor system is one of a gamma ray detection system, a toolface sensor system, an inclination sensor system, and azimuthal sensor system, a pressure sensor system, a temperature sensor system, a vibration sensor system, a formation parameter measurement system, a strain gauge sensor system, or a combination thereof.

Embodiment 20. The system of embodiment 18, wherein the signal indicates a failed operation of the sensor system.

Embodiment 21. The system of embodiment 1, wherein the signal indicates a failed operation of the pulser.

Embodiment 22. The system of embodiment 1, wherein the signal comprises multiple sets of synthetic pressure pulses that emulate multiple sets of pressure pulses from the pulser, and wherein the data acquisition computer compares the signal to a signature stored in a signature database and establishes a score for the logging tool based on the comparison.

Embodiment 23. The system of embodiment 1, wherein the sensor assembly is removably attached to the pulser, wherein the sensor assembly comprises a left arm, a right arm, and a center portion that form an opening in the sensor assembly.

Embodiment 24. The system of embodiment 23, wherein when the sensor assembly is removably attached to a body of the pulser, the left arm and the right arm move radially away from each other to allow space for the body to enter the opening, and the left arm and the right arm move radially toward each other when the body is received in the opening, and wherein the left arm and the right arm retain the body in the opening.

Embodiment 25. The system of embodiment 24, wherein portions of the center portion, the left arm, and the right arm generally align with a circular outer surface of the body, when the body is retained in the opening.

Embodiment 26. The system of embodiment 24, wherein the left arm comprises an enlarged left end portion and the right arm comprises an enlarged right end portion, and wherein a distance between the enlarged left end portion and the enlarged right end portion is less than an outer diameter of the body, when the body is retained in the opening.

Embodiment 27. A method for testing operation of a tool used for subterranean operations, the method comprising:

positioning a sensor assembly proximate to a body of a pulser of a logging tool;

detecting operation of the pulser via the sensor assembly; and emulating pressure pulses from the pulser by converting, via the sensor assembly, the detected pulser operation into synthetic pressure pulses.

Embodiment 28. The method of embodiment 27, wherein positioning the sensor assembly proximate to the body further comprises removably attaching the sensor assembly to the body.

Embodiment 29. The method of embodiment 27, further comprising:

transmitting, via wired or wireless telemetry, the synthetic pressure pulses to a data acquisition computer; and comparing the synthetic pressure pulses to an expected signature of pressure pulses.

Embodiment 30. The method of embodiment 29, further comprising determining a score for the logging tool based on the comparison of the synthetic pressure pulses to the expected signature of pressure pulses.

Embodiment 31. The method of embodiment 30, wherein the score for the logging tool comprises a score for a sensor system in the logging tool.

Embodiment 32. The method of embodiment 31, wherein the sensor system comprises at least one of a gamma ray detection system, a toolface sensor system, an inclination sensor system, an azimuthal sensor system, a pressure sensor system, a temperature sensor system, a vibration sensor system, a formation parameter measurement system, a strain gauge sensor system, or combinations thereof.

Embodiment 33. The method of embodiment 30, further comprising:

initiating corrective action for repair of the logging tool, when the score is below a predetermined value; and indicating the logging tool is ready for installation in a drill collar when the score is equal to or above the predetermined value.

Embodiment 34. The method of embodiment 33, further comprising creating a job run report that contains results of the testing of the logging tool.

Embodiment 35. The method of embodiment 34, wherein the job run report comprises the score of the logging tool, the synthetic pressure pulses that failed the comparison, when testing was performed, who performed the testing, an indication whether the testing passed or failed, and a recommended corrective action, if the testing failed.

Embodiment 36. The method of embodiment 27, further comprising performing an action with the logging tool that causes the pulser to operate.

Embodiment 37. The method of embodiment 36, wherein the action is one of the following:

waking up the logging tool;

rotating the logging tool to a vertical orientation;

rotating the logging tool to change a toolface angle;

vibrating the logging tool to emulate fluid flow through the logging tool;

heating the logging tool to emulate downhole temperatures; or combinations thereof.

Embodiment 38. The method of embodiment 27, wherein detecting operation of the pulser comprises detecting, via the sensor assembly, a change of a detectable object in the pulser that occurs each time a valve in the pulser is operated, and wherein emulating the pressure pulses comprises converting the detected change of the detectable object into the synthetic pressure pulses.

Embodiment 39. The method of embodiment 38, wherein the detectable object is a motor, a movable magnetized object, a movable magnet, an energizable coil, or combinations thereof.

Embodiment 40. The method of embodiment 38, wherein the detected change of the detectable object comprises multiple sets of detected changes of the detectable object, and wherein emulating the pressure pulses comprises converting the detected changes of the detectable object into multiple sets of the synthetic pressure pulses.

Embodiment 41. The method of embodiment 40, wherein each one of the multiple sets of the synthetic pressure pulses is representative of data received from a sensor system of the logging tool and transmitted to the pulser, which operates as if producing pressure pulses downhole for mud pulse telemetry.

Embodiment 42. The method of embodiment 40, further comprising:

transmitting the sets of synthetic pressure pulses to a data acquisition computer; and comparing the sets of synthetic pressure pulses to an expected signature of sets of pressure pulses.

Embodiment 43. The method of embodiment 42, wherein each one of the multiple sets of synthetic pressure pulses is representative of data received from a sensor system.

Embodiment 44. The method of embodiment 42, further comprising verifying operation of the logging tool by verifying that each one of the sets of multiple synthetic pressure pulses is from an expected sensor system of the logging tool.

Embodiment 45. The method of embodiment 27, wherein the sensor assembly comprises a sensor that detects the operation of the pulser.

Embodiment 46. The method of embodiment 45, wherein the sensor comprises a cell phone.

Embodiment 47. The method of embodiment 46, wherein the cell phone wirelessly transmits the synthetic pressure pulses to a data acquisition computer.

Embodiment 48. The method of embodiment 45, wherein the sensor comprises a smart watch.

Embodiment 49. The method of embodiment 48, wherein the smart watch wirelessly transmits the synthetic pressure pulses to a data acquisition computer.

Embodiment 50. A method of verifying operation of a tool for subterranean operations, the method comprising:

positioning a sensor assembly proximate to a body of a pulser of a logging tool;

waking up the logging tool outside of a drill collar;

detecting operation of the pulser, via the sensor assembly, in response to waking the logging tool;

emulating pressure pulses from the pulser by converting, via the sensor assembly, the detected pulser operation into synthetic pressure pulses;

transmitting the synthetic pressure pulses to a data acquisition computer;

comparing, via the data acquisition computer, the synthetic pressure pulses to expected pressure pulses stored in a database; and determining a score for the logging tool based on the comparing.

Embodiment 51. The method of embodiment 50, wherein positioning the sensor assembly proximate to the body further comprises removably attaching the sensor assembly to the body.

Embodiment 52. A method of verifying operation of a tool for subterranean operations, the method comprising:

positioning a sensor assembly proximate to a body of a pulser of a logging tool;

rotating the logging tool outside of a drill collar;

detecting operation of the pulser, via the sensor assembly, in response to rotating the logging tool;

emulating pressure pulses from the pulser by converting, via the sensor assembly, the detected pulser operation into synthetic pressure pulses;

transmitting the synthetic pressure pulses to a data acquisition computer;

comparing, via the data acquisition computer, the synthetic pressure pulses to expected pressure pulses stored in a database; and determining a score for the logging tool based on the comparing.

Embodiment 53. The method of embodiment 52, wherein positioning the sensor assembly proximate to the body further comprises removably attaching the sensor assembly to the body.

Embodiment 54. A method of verifying operation of a tool for subterranean operations, the method comprising:

positioning a sensor assembly proximate to a body of a pulser of a logging tool;

tilting the logging tool, while outside of a drill collar, to an angle between horizontal and vertical;

detecting operation of the pulser, via the sensor assembly, in response to tilting the logging tool;

emulating pressure pulses from the pulser by converting, via the sensor assembly, the detected pulser operation into synthetic pressure pulses;

transmitting the synthetic pressure pulses to a data acquisition computer;

comparing, via the data acquisition computer, the synthetic pressure pulses to expected pressure pulses stored in a database; and determining a score for the logging tool based on the comparing.

Embodiment 55. The method of embodiment 54, wherein positioning the sensor assembly proximate to the body further comprises removably attaching the sensor assembly to the body.

Embodiment 56. A system for testing operation of a tool used for subterranean operations, the system comprising:

a logging tool that comprises a pulser, wherein the logging tool is outside a wellbore, and wherein the pulser is configured to operate a detectable object that is configured to produce pressure pulses in the wellbore; and a sensor assembly that is configured to detect, via one or more sensors, a change in a parameter of the detectable object in the pulser when the logging tool operates the detectable object.

Embodiment 57. The system of embodiment 56, wherein the sensor assembly is removably attached to the pulser.

Embodiment 58. The system of embodiment 56, wherein the sensor assembly transmits a signal to a data acquisition computer, and wherein the signal is representative of one or more parameter changes of the detectable object.

Embodiment 59. The system of embodiment 56, wherein the parameter is one of a position of the detectable object, an orientation of the detectable object, a magnetic field of the detectable object, an acoustic signal from the detectable object, or a combination thereof.

Embodiment 60. The system of embodiment 56, wherein the one or more sensors comprise a cell phone, a smart watch, a magnetometer, an acoustic sensor, a vibration sensor, a Hall effect sensor, a magneto-diode, a magneto-transistor, magneto-optical sensor, a Lorentz force based Micro Electro-Mechanical System (MEMS) sensor, an electron tunneling based MEMS sensor, a MEMS compass, nuclear precession magnetic field sensor, optically pumped magnetic field sensor, a search coil magnetic field sensor, or combinations thereof.

Embodiment 61. The system of embodiment 58, wherein the signal comprises synthetic pressure pulses that emulate pressure pulses from the pulser, and wherein the data acquisition computer is configured to compare the signal to an expected signal stored in a signature database and establish a score for the logging tool based on the comparison.

Embodiment 62. The system of embodiment 61, wherein the data acquisition computer is configured to verify operation of a sensor system in the logging tool based on the comparison of the signal to the expected signal.

Embodiment 63. The system of embodiment 62, wherein the sensor system is one of a gamma ray detection system, a toolface sensor system, an inclination sensor system, and azimuthal sensor system, a pressure sensor system, a temperature sensor system, a vibration sensor system, a formation parameter measurement system, a strain gauge sensor system, or a combination thereof.

Embodiment 64. The system of embodiment 62, wherein the signal indicates a failed operation of the sensor system.

Embodiment 65. The system of embodiment 58, wherein the signal indicates a failed operation of the pulser.

Embodiment 66. The system of embodiment 58, wherein the signal comprises multiple sets of synthetic pressure pulses that emulate multiple sets of pressure pulses from the pulser, and wherein the data acquisition computer compares the signal to an expected signal stored in a signature database and establishes a score for the logging tool based on the comparison.

Embodiment 67. A method for testing operation of a tool used for subterranean operations, the method comprising:

operating a pulser of a logging tool outside of a bottom hole assembly;

detecting operation of the pulser via one or more sensors of a sensor assembly; and creating synthetic pressure pulses, via the sensor assembly, based upon the detected operation of the pulser.

Embodiment 68. The method of embodiment 67, further comprising removably attaching the sensor assembly to a body of the pulser.

Embodiment 69. The method of embodiment 67, further comprising:

transmitting, via wired or wireless telemetry, the synthetic pressure pulses to a data acquisition computer; and comparing the synthetic pressure pulses to an expected signature of pressure pulses.

Embodiment 70. The method of embodiment 69, further comprising determining a score for the logging tool based on the comparison of the synthetic pressure pulses to the expected signature of pressure pulses.

Embodiment 71. The method of embodiment 70, wherein the score for the logging tool comprises a score for a sensor system in the logging tool.

Embodiment 72. The method of embodiment 71, wherein the sensor system comprises at least one of a gamma ray detection system, a toolface sensor system, an inclination sensor system, an azimuthal sensor system, a pressure sensor system, a temperature sensor system, a vibration sensor system, a formation parameter measurement system, a strain gauge sensor system, or combinations thereof.

Embodiment 73. The method of embodiment 70, further comprising:

indicating that corrective action to repair the logging tool is needed, when the score is below a predetermined value; and indicating the logging tool is ready for installation in a drill collar when the score is equal to or above the predetermined value.

Embodiment 74. The method of embodiment 67, wherein detecting operation of the pulser comprises detecting, via the sensor assembly, a change of a parameter of a detectable object in the pulser that occurs each time a valve in the pulser is operated, and wherein emulating the pressure pulses comprises converting the detected changes of the parameter into the synthetic pressure pulses.

Embodiment 75. The method of embodiment 74, wherein the detected change of the detectable object comprises multiple sets of detected changes of the detectable object, and wherein emulating the pressure pulses comprises converting the detected changes of the detectable object into multiple sets of the synthetic pressure pulses.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A system for testing operation of a tool used for subterranean operations, the system comprising:

a logging tool that comprises a pulser, wherein the logging tool is outside a wellbore, wherein the pulser is configured to operate a detectable object that is configured to produce pressure pulses in the wellbore; and a sensor assembly that is configured to detect, via one or more sensors, a change in a parameter of the detectable object in the pulser when the logging tool operates the detectable object.

2. The system of claim 1, wherein the sensor assembly is removably attached to the pulser.

3. The system of claim 1, wherein the sensor assembly transmits a signal to a data acquisition computer, and wherein the signal is representative of one or more parameter changes of the detectable object.

4. The system of claim 3, wherein the signal comprises synthetic pressure pulses that emulate pressure pulses from the pulser, and wherein the data acquisition computer is configured to compare the signal to an expected signal stored in a signature database and establish a score for the logging tool based on the comparison.

5. The system of claim 4, wherein the data acquisition computer is configured to verify operation of a sensor system in the logging tool based on the comparison of the signal to the expected signal.

6. The system of claim 5, wherein the sensor system is one of a gamma ray detection system, a toolface sensor system, an inclination sensor system, and azimuthal sensor system, a pressure sensor system, a temperature sensor system, a vibration sensor system, a formation parameter measurement system, a strain gauge sensor system, or a combination thereof.

7. The system of claim 5, wherein the signal indicates a failed operation of the sensor system.

8. The system of claim 3, wherein the signal indicates a failed operation of the pulser.

9. The system of claim 3, wherein the signal comprises multiple sets of synthetic pressure pulses that emulate multiple sets of pressure pulses from the pulser, and wherein the data acquisition computer compares the signal to an expected signal stored in a signature database and establishes a score for the logging tool based on the comparison.

10. The system of claim 1, wherein the parameter is one of a position of the detectable object, an orientation of the detectable object, a magnetic field of the detectable object, an acoustic signal from the detectable object, or a combination thereof.

11. The system of claim 1, wherein the one or more sensors comprise a cell phone, a smart watch, a magnetometer, an acoustic sensor, a vibration sensor, a Hall effect sensor, a magneto-diode, a magneto-transistor, magneto-optical sensor, a Lorentz force based Micro Electro-Mechanical System (MEMS) sensor, an electron tunneling based MEMS sensor, a MEMS compass, nuclear precession magnetic field sensor, optically pumped magnetic field sensor, a search coil magnetic field sensor, or combinations thereof.

12. A method for testing operation of a tool used for subterranean operations, the method comprising:

operating a pulser of a logging tool outside of a bottom hole assembly;

detecting operation of the pulser via one or more sensors of a sensor assembly; and creating synthetic pressure pulses, via the sensor assembly, based upon the detected operation of the pulser.

13. The method of claim 12, further comprising removably attaching the sensor assembly to a body of the pulser.

14. The method of claim 12, further comprising:

transmitting, via wired or wireless telemetry, the synthetic pressure pulses to a data acquisition computer; and comparing the synthetic pressure pulses to an expected signature of pressure pulses.

15. The method of claim 14, further comprising:

determining a score for the logging tool based on the comparison of the synthetic pressure pulses to the expected signature of pressure pulses.

16. The method of claim 15, wherein the score for the logging tool comprises a score for a sensor system in the logging tool.

17. The method of claim 16, wherein the sensor system comprises at least one of a gamma ray detection system, a toolface sensor system, an inclination sensor system, an azimuthal sensor system, a pressure sensor system, a temperature sensor system, a vibration sensor system, a formation parameter measurement system, a strain gauge sensor system, or combinations thereof.

18. The method of claim 15, further comprising:

indicating that corrective action to repair the logging tool is needed, when the score is below a predetermined value; and indicating the logging tool is ready for installation in a drill collar when the score is equal to or above the predetermined value.

19. The method of claim 12, wherein detecting operation of the pulser comprises detecting, via the sensor assembly, a change of a parameter of a detectable object in the pulser that occurs each time a valve in the pulser is operated, and wherein emulating the pressure pulses comprises converting the detected changes of the parameter into the synthetic pressure pulses.

20. The method of claim 19, wherein the detected change of the detectable object comprises multiple sets of detected changes of the detectable object, and wherein emulating the pressure pulses comprises converting the detected changes of the detectable object into multiple sets of the synthetic pressure pulses.

* * * * *